(12) United States Patent
Mecca

(10) Patent No.: US 12,200,167 B1
(45) Date of Patent: Jan. 14, 2025

(54) APPARATUS AND METHOD FOR ANSWERING A USER COMMUNICATION

(71) Applicant: PortPro Technologies, Inc., Jersey City, NJ (US)

(72) Inventor: Michael Mecca, Ridgefield, NJ (US)

(73) Assignee: PortPro Technologies, Inc., Jersey City, NJ (US)

( * ) Notice: Subject to any disclaimer, the term of this patent is extended or adjusted under 35 U.S.C. 154(b) by 0 days.

(21) Appl. No.: 18/651,250

(22) Filed: Apr. 30, 2024

(51) Int. Cl.
  *H04M 3/436* (2006.01)
  *H04M 3/42* (2006.01)

(52) U.S. Cl.
  CPC ..... *H04M 3/42068* (2013.01); *H04M 3/4365* (2013.01)

(58) Field of Classification Search
  CPC .................. H04M 3/42068; H04M 3/4365
  See application file for complete search history.

(56) References Cited

U.S. PATENT DOCUMENTS

| | | | |
|---|---|---|---|
| 7,535,916 B2 | 5/2009 | Stewart et al. | |
| 11,115,528 B1 * | 9/2021 | Rao | H04M 3/527 |
| 2020/0288016 A1 * | 9/2020 | Butler | H04M 3/5141 |
| 2020/0294101 A1 * | 9/2020 | Bell | G06F 40/279 |
| 2021/0201896 A1 * | 7/2021 | Tran | G10L 15/16 |
| 2021/0360106 A1 * | 11/2021 | Matula | G06F 40/51 |
| 2022/0101220 A1 * | 3/2022 | Wicaksono | G06Q 10/0633 |

FOREIGN PATENT DOCUMENTS

| | | |
|---|---|---|
| CN | 206466734 U | 9/2017 |
| CN | 116720804 A | 9/2023 |
| CN | 117592879 A | 2/2024 |
| ZA | 201702689 B | 6/2019 |

\* cited by examiner

*Primary Examiner* — Barry W Taylor
(74) *Attorney, Agent, or Firm* — Caldwell Intellectual Property Law

(57) ABSTRACT

An apparatus and method for answering a user communication, wherein the apparatus includes at least a processor, a computer-readable storage medium communicatively connected to the at least a processor, wherein the computer-readable storage medium contains instructions configuring the at least processor to receive a user communication comprising contextual data, classify the user communication to a contact profile, classify the contextual data to an action table within a repository, and answer the user communication.

14 Claims, 7 Drawing Sheets

APPARATUS AND METHOD FOR ANSWERING A USER COMMUNICATION

FIELD OF THE INVENTION

The present invention generally relates to the field of data management systems. In particular, the present invention is directed to an apparatus and method for answering a user communication.

BACKGROUND

Current data management system are challenged with efficiently classifying and responding to diverse and complex user communications in real-time. There is a need for a data management system that addresses the challenge of processing large volumes of data and accurately ensuring that the responses generated are relevant and timely.

SUMMARY OF THE DISCLOSURE

In an aspect, an apparatus for answering a user communication is disclosed. The apparatus includes at least a processor, a computer-readable storage medium communicatively connected to the at least a processor, wherein the computer-readable storage medium contains instructions configuring the at least processor to receive a user communication comprising contextual data, classify the user communication to a contact profile, wherein classifying the user communication to a contact profile includes preprocessing the user communication, extracting, using a feature extraction algorithm, features from the contextual data, training a contact classifier with historical data correlating contextual data to features of a plurality of contact profiles, inputting the processed user communication into the contact classifier, and outputting, by the contact classifier, the contact profile, classify the contextual data to an action table within a repository, and answer the user communication.

In another aspect, a method for answering a user communication is disclosed. The method includes receiving, by a computing device, a user communication comprising contextual data, classifying, by the computing device, the user communication to a contact profile, wherein classifying the user communication to a contact profile includes preprocessing the user communication, extracting, using a feature extraction algorithm, features from the contextual data, training a contact classifier with historical data correlating contextual data to features of a plurality of contact profiles, inputting the processed user communication into the contact classifier, and outputting, by the contact classifier, the contact profile, classifying, by the computing device, the contextual data to an action table within a repository, and answering, by the computing device, the user communication.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for answering a user communication.

Aspects of the present disclosure can be used for seamless integration of diverse communication channels such as email, chat, and social media, ensuring consistent and responsive interactions with parties of transportation management systems.

Aspects of the present disclosure allow for a centralized repository for storing and accessing communication history, enabling easy retrieval of past interactions, and facilitating informed decision-making. Exemplary embodiments illustrating aspects of the present disclosure are described below in the context of several specific examples.

Figure 1:
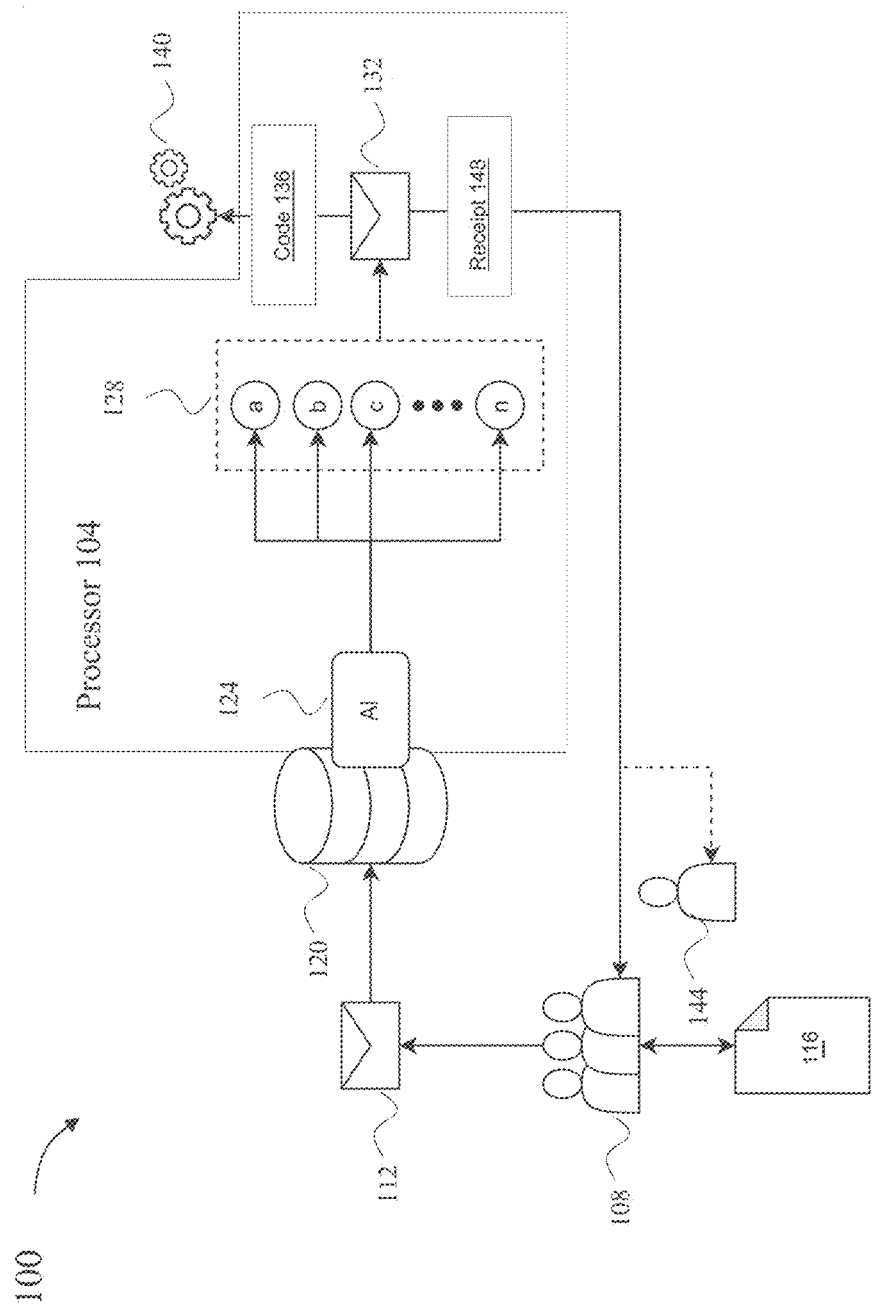
FIG. 1 is an illustration of an exemplary apparatus for answering a user communication.

Referring now to FIG. 1, an exemplary embodiment of an apparatus 100 for answering a user communication is illustrated. Apparatus 100 includes a computing device. Computing device includes a processor communicatively connected to a memory. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Further referring to FIG. 1, processor 104 may include any computing device as described in this disclosure, including without limitation a microcontroller, microprocessor, digital signal processor (DSP) and/or system on a chip (SoC) as described in this disclosure. Processor 104 may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented, as a non-limiting example, using a "shared nothing" architecture.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, processor 104 is communicatively connected to a user interface (UI). A "user interface," as used herein, is a means by which a user and a computer system interact; for example, through the use of input devices and software. A user interface may include a graphical user interface (GUI), command line interface (CLI), menu-driven user interface, touch user interface, voice user interface (VUI), form-based user interface, any combination thereof, and the like. A user interface may include a smartphone, smart tablet, desktop, or laptop operated by the user. In an embodiment, the user interface may include a graphical user interface. A "graphical user interface (GUI)," as used herein, is a graphical form of user interface that allows user s to interact with electronic devices. In some embodiments, GUI may include icons, menus, other visual indicators, or representations (graphics), audio indicators such as primary notation, and display information and related user controls. A menu may contain a list of choices and may allow user s to select one from them. A menu bar may be displayed horizontally across the screen such as pull-down menu. When any option is clicked in this menu, then the pulldown menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access. Information contained in user interface may be directly influenced using graphical control elements such as widgets. A "widget," as used herein, is a user control element that allows a user to control and change the appearance of elements in the user interface. In this context a widget may refer to a generic GUI element such as a check box, button, or scroll bar to an instance of that element, or to a customized collection of such elements used for a specific function or application (such as a dialog box for user s to customize their computer screen appearances). User interface controls may include software components that a user interacts with through direct manipulation to read or edit information displayed through user interface. Widgets may be used to display lists of related items, navigate the system using links, tabs, and manipulate data using check boxes, radio boxes, and the like.

Still Referring to FIG. 1, the user interface may include a chatbot designed to facilitate interactive and responsive communication between the user and the system. The chatbot may serve as an integral component of the UI, providing user s with a conversational interface through which they can obtain information, perform tasks, or get assistance.

Still referring to FIG. 1, the chatbot may include a large language model (LLM). A "large language model," as used herein, is a deep learning data structure that can recognize, summarize, translate, predict and/or generate text and other content based on knowledge gained from massive datasets. Large language models may be trained on large sets of data.

Training sets may be drawn from diverse sets of data such as, as non-limiting examples, novels, blog posts, articles, emails, unstructured data, electronic records, and the like. In some embodiments, training sets may include a variety of subject matters, such as, as nonlimiting examples, medical report documents, electronic health records, entity documents, business documents, inventory documentation, emails, user communication 112s, advertising documents, newspaper articles, and the like. In some embodiments, training sets of an LLM may include information from one or more public or private databases. As a non-limiting example, training sets may include databases associated with an entity. In some embodiments, training sets may include portions of documents associated with the electronic records 112 correlated to examples of outputs. In an embodiment, an LLM may include one or more architectures based on capability requirements of an LLM. Exemplary architectures may include, without limitation, GPT (Generative Pretrained Transformer), BERT (Bidirectional Encoder Representations from Transformers), T5 (Text-To-Text Transfer Transformer), and the like. Architecture choice may depend on a needed capability such generative, contextual, or other specific capabilities.

With continued reference to FIG. 1, in some embodiments, an LLM may be generally trained. As used in this disclosure, a "generally trained" LLM is an LLM that is trained on a general training set comprising a variety of subject matters, data sets, and fields. In some embodiments, an LLM may be initially generally trained. Additionally, or alternatively, an LLM may be specifically trained. As used in this disclosure, a "specifically trained" LLM is an LLM that is trained on a specific training set, wherein the specific training set includes data including specific correlations for the LLM to learn. As a non-limiting example, an LLM may be generally trained on a general training set, then specifically trained on a specific training set. In an embodiment, specific training of an LLM may be performed using a supervised machine learning process. In some embodiments, generally training an LLM may be performed using an unsupervised machine learning process. As a non-limiting example, specific training set may include information from a database. As a non-limiting example, specific training set may include text related to the users such as user specific data for electronic records correlated to examples of outputs. In an embodiment, training one or more machine learning models may include setting the parameters of the one or more models (weights and biases) either randomly or using a pretrained model. Generally training one or more machine learning models on a large corpus of text data can provide a starting point for fine-tuning on a specific task. A model such as an LLM may learn by adjusting its parameters during the training process to minimize a defined loss function, which measures the difference between predicted outputs and ground truth. Once a model has been generally trained, the model may then be specifically trained to fine-tune the pretrained model on task-specific data to adapt it to the target task. Fine-tuning may involve training a model with task-specific training data, adjusting the model's weights to optimize performance for the particular task. In some cases, this may include optimizing the model's performance by fine-tuning hyperparameters such as learning rate, batch size, and regularization. Hyperparameter tuning may help in achieving the best performance and convergence during training. In an embodiment, fine-tuning a pretrained model such as an LLM may include fine-tuning the pretrained model using Low-Rank Adaptation (LoRA). As used in this disclosure, "Low-Rank Adaptation" is a training technique for large language models that modifies a subset of parameters in the model. Low-Rank Adaptation may be configured to make the training process more computationally efficient by avoiding a need to train an entire model from scratch. In an exemplary embodiment, a subset of parameters that are updated may include parameters that are associated with a specific task or domain.

With continued reference to FIG. 1, in some embodiments an LLM may include and/or be produced using Generative Pretrained Transformer (GPT), GPT-2, GPT-3, GPT-4, and the like. GPT, GPT-2, GPT-3, GPT-3.5, and GPT-4 are products of Open Al Inc., of San Francisco, CA. An LLM may include a text prediction based algorithm configured to receive an article and apply a probability distribution to the words already typed in a sentence to work out the most likely word to come next in augmented articles. For example, if some words that have already been typed are "Nice to meet", then it may be highly likely that the word "you" will come next. An LLM may output such predictions by ranking words by likelihood or a prompt parameter. For the example given above, an LLM may score "you" as the most likely, "your" as the next most likely, "his" or "her" next, and the like. An LLM may include an encoder component and a decoder component.

Still referring to FIG. 1, an LLM may include a transformer architecture. In some embodiments, encoder component of an LLM may include transformer architecture. A "transformer architecture," for the purposes of this disclosure is a neural network architecture that uses self-attention and positional encoding. Transformer architecture may be designed to process sequential input data, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 1, an LLM and/or transformer architecture may include an attention mechanism. An "attention mechanism," as used herein, is a part of a neural architecture that enables a system to dynamically quantify the relevant features of the input data. In the case of natural language processing, input data may be a sequence of textual elements. It may be applied directly to the raw input or to its higher-level representation.

With continued reference to FIG. 1, attention mechanism may represent an improvement over a limitation of an encoder-decoder model. An encoder-decider model encodes an input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, an LLM may predict the next word by searching for a set of positions in a source sentence where the most relevant information is concentrated. An LLM may then predict the next word based on context vectors associated with these source positions and all the previously generated target words, such as textual data of a dictionary correlated to a prompt in a training dataset. A "context vector," as used herein, are fixed-length vector representations useful for document retrieval and word sense disambiguation.

Still referring to FIG. 1, attention mechanism may include, without limitation, generalized attention self-attention, multi-head attention, additive attention, global attention, and the like. In generalized attention, when a sequence of words or an image is fed to an LLM, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, an LLM may pick up particular parts at different positions in the input sequence and over time compute an initial composition of the output sequence. In multi-head attention, an LLM may include a transformer model of an attention mechanism. Attention mechanisms, as described above, may provide context for any position in the input sequence. For example, if the input data is a natural language sentence, the transformer does not have to process one word at a time. In multi-head attention, computations by an LLM may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive attention (Bahdanau attention mechanism), an LLM may make use of attention alignment scores based on a number of factors. Alignment scores may be calculated at different points in a neural network, and/or at different stages represented by discrete neural networks. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, an LLM may either attend to all source words or predict the target sentence, thereby attending to a smaller subset of words.

With continued reference to FIG. 1, multi-headed attention in encoder may apply a specific attention mechanism called self-attention. Self-attention allows models such as an LLM or components thereof to associate each word in the input, to other words. As a non-limiting example, an LLM may learn to associate the word "you", with "how" and "are". It's also possible that an LLM learns that words structured in this pattern are typically a question and to respond appropriately. In some embodiments, to achieve self-attention, input may be fed into three distinct fully connected neural network layers to create query, key, and value vectors. Query, key, and value vectors may be fed through a linear layer; then, the query and key vectors may be multiplied using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

Still referencing FIG. 1, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 1, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

Continuing to refer to FIG. 1, transformer architecture may include a decoder. Decoder may a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

With further reference to FIG. 1, in some embodiments, input to decoder may go through an embedding layer and positional encoding layer in order to obtain positional embeddings. Decoder may include a first multi-headed attention layer, wherein the first multi-headed attention layer may receive positional embeddings.

With continued reference to FIG. 1, first multi-headed attention layer may be configured to not condition to future tokens. As a non-limiting example, when computing attention scores on the word "am," decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "0s" and negative infinities. For example, the top right triangle portion of look-ahead mask may be filled with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the softmax of this matrix is taken, the negative infinities will be zeroed out; this leaves zero attention scores for "future tokens".

Still referring to FIG. 1, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIG. 1, the output of the pointwise feedforward layer may be fed through a final linear layer. This final linear layer may act as a classifier. This classifier may be as big as the number of classes that you have. For example, if you have 10,000 classes for 10,000 words, the output of that classifier will be of size 10,000. The output of this classifier may be fed into a softmax layer which may serve to produce probability scores between zero and one. The index may be taken of the highest probability score in order to determine a predicted word.

Still referring to FIG. 1, decoder may take this output and add it to the decoder inputs. Decoder may continue decoding until a token is predicted. Decoder may stop decoding once it predicts an end token.

Continuing to refer to FIG. 1, in some embodiment, decoder may be stacked N layers high, with each layer taking in inputs from the encoder and layers before it. Stacking layers may allow an LLM to learn to extract and focus on different combinations of attention from its attention heads.

With continued reference to FIG. 1, an LLM may receive an input. Input may include a string of one or more characters. Inputs may additionally include unstructured data. For example, input may include one or more words, a sentence, a paragraph, a thought, a query, and the like. A "query" for the purposes of the disclosure is a string of characters that poses a question. In some embodiments, input may be received from a user device. User device may be any computing device that is used by a user. As non-limiting examples, user device may include desktops, laptops, smartphones, tablets, and the like.

With continued reference to FIG. 1, an LLM may generate at least one annotation as an output. At least one annotation may be any annotation as described herein. In some embodiments, an LLM may include multiple sets of transformer architecture as described above. Output may include a textual output. A "textual output," for the purposes of this disclosure is an output comprising a string of one or more characters. Textual output may include, for example, a plurality of annotations for unstructured data. In some embodiments, textual output may include a phrase or sentence identifying the status of a user query. In some embodiments, textual output may include a sentence or plurality of sentences describing a response to a user query. As a non-limiting example, this may include restrictions, timing, advice, dangers, benefits, and the like.

Still referring to FIG. 1, a user interface (UI) may include user interface embodiments as disclosed in Non-provisional application Ser. No. 18/584,209 filed on Feb. 22, 2024, and entitled "APPARATUS AND METHOD FOR COMMUNICATION WITH AN INTERMODAL TERMINAL," the entirety of which is incorporated herein by reference.

Still referring to FIG. 1, processor 104 may be configured to establish a communication channel through the user interface to a user 108. A user 108 may include a person such as a carrier of a load to an intermodal terminal. A "communication channel," as used herein, is a medium through which information is transmitted from a sender to a receiver. For example, the sender may be the carrier and the receiver may be processor 104 or other third parties such as an intermodal terminal supervisor, and the like. An "intermodal terminal," as used herein, is a facility that is responsible for the transfer of freight from one mode of transfer to another. For example, an intermodal terminal may be responsible for the transfer of a cargo container from a ship to a truck. Intermodal terminals contain the proper infrastructure to facilitate the transition between various modes of transport such as but not limited to, from rail to road, from sea to road and the like. Processor 104 may establish a communication via the user interface to a user device. A user device may include a computer, smartphone, tablet, or any other device that a user 108 interacts with. Establishing the communication channel may include implementing a set of communication protocols. "Communication protocols," as used herein, are sets of rules that dictate how data is transmitted and received over a network, ensuring that devices with different designs and purposes can communicate effectively. A communication protocol may include, without limitation internet protocol (IP), controller area network (CAN) protocols, serial communication protocols (e.g., universal asynchronous receiver-transmitter [UART]), parallel communication protocols (e.g., IEEE 128 [printer port]), Bluetooth, NFC, and other wireless protocols and the like.

Still referring to FIG. 1, establishing the communication channel may include encrypting data received from a sender by transforming data into a secure format that's unreadable without the correct decryption key. Establishing the communication channel may include an authentication processes for verifying user 108 and device identities to ensure that only authorized parties can access or initiate communication by employing methods like passwords, digital certificates, and two-factor authentication. To maintain data integrity, techniques such as checksums and cryptographic hashes may be utilized, confirming that the received data matches the sent data, thereby detecting any alterations or corruption. Moreover, network security measures, including firewalls and intrusion detection systems, may be implemented to defend the communication channel against unauthorized access and potential cyber threats, ensuring a secure and reliable exchange of information.

Still referring to FIG. 1, processor 104 is configured to receive a user communication 112. A "user communication," as used herein, is data sent by a user through a user interface. A user 108 may include a person of entity involved in the business of intermodal transportation. For example, a user 108 may include a shipper, carrier, freight forwarder, intermodal operator or IMCs (Intermodal Marketing Companies), terminal operator, customs and regulatory authority, and the like. User communication 112 may include a direct input, wherein users 108 directly input data into the system via the UI. For example, through typing on a keyboard, clicking or tapping on a screen, or using voice commands. User communication 112 may include a file upload, wherein, users 108 can transmit data, such as documents, images and other types of files, to processor 104 by uploading files through the UI. Receiving a user communication(s) 112 may include batch processing. "Batch processing," as used herein, is a method where data is collected and processed in groups or "batches" rather than being processed in real-time or item by item. In this embodiment, users 108 may interact with the user interface to input or select multiple data points or files. This may involve filling out forms, selecting multiple items from a list, or uploading several files at once. The UI accumulates these inputs without immediately sending each one for processing. For example, users 108, such as logistics planners or freight managers, might need to enter multiple transport requests or schedule several shipments simultaneously. Through the UI, they can input data for various legs of each journey, select transportation modes, and define schedules. Once all the necessary information is compiled, it can be submitted as a batch for processing, enabling apparatus 100 to optimize routes, schedules, and resource allocation. Processor 104 may receive the entire batch and processes it as a unit. This may happen immediately or be scheduled for a more optimal time. Batch processing may allow processor 104 to apply the same processing rules uniformly to the entire set, which can be more efficient than processing each item individually. After processing, the results may be returned as a single batch to the user interface. The user 108 may then receive a comprehensive report or results from the batch operation, which may include confirmations, summaries, or the processed data itself. Batch processing may reduce the computational load and optimize resource usage. By processing data in large chunks, processor 104 may minimize the overhead of starting and stopping processes for each piece of data, which may be particularly beneficial in environments where processing resources are shared or limited.

Still referring to FIG. 1, user communication 112 may include textual data, such as an email, or text received through a chatbot as described herein. User communication 112 may include transportation management system (TMS) contextual data, also referred to contextual data herein. "Transportation management system contextual data," as used herein, is data related to the realm of intermodal transportation in a user communication. TMS contextual data may include load information such as comprehensive information about the cargo, such as weight, volume, type of goods, packaging, and any special handling or transportation requirements (e.g., refrigeration for perishables, hazardous material handling protocols). TMS contextual data may include routing information regarding the origin and destination of each shipment, including specific pickup and drop-off locations. Routing information may also include preferred routes or necessary route exclusions (due to restrictions or hazards). TMS contextual data may include transportation modes involved in each leg of the journey, such as truck, rail, ship, or air transport, along with specific preferences or constraints for each mode. TMS contextual data may include scheduling data including desired departure and arrival times, transit time requirements, and any relevant scheduling constraints to ensure timely delivery and efficient route planning. TMS contextual data may include data related to transportation costs, including quotes, tariffs, and fees associated with different transportation modes, routes, or carriers, for budgeting and financial planning. TMS contextual data may include documentation, such as bills of lading, customs documentation, insurance certificates, and other regulatory or compliance-related documents. TMS contextual data may include information related to the real-time location and status of shipments to monitor progress, anticipate delays, and coordinate with partners along the supply chain.

Still referring to FIG. 1, TMS contextual data may include a quote request. "Quote request," as used herein, is a formal or informal inquiry made by a potential user 108 seeking detailed information on the cost and terms of transportation services for specific goods over a defined route. This request may initiate the process of generating a transportation quote, which outlines the estimated price and service conditions based on the provided details. The quote request may include a user's 108 contact information, company details, and any relevant user 108 identifiers to help the processor 104 associate the request with existing customer data or accounts. The quote request may specify the nature, quantity, weight, and dimensions of the goods to be transported. The quote request may include a starting point and a final destination of a shipment. The quote request may include any special handling or service needs, such as refrigeration for perishable items, hazardous material handling, or expedited delivery. The quote request may include a desired timeline for the shipment, including pickup and delivery dates.

Still referring to FIG. 1, TMS contextual data may include a tender request. A "tender request," a used herein, is a solicitation asking for bids or proposals from transportation service providers to carry out specific transport services. The tender request may include details around the specific transportation services needed, which may include the types of goods to be transported, the volume of shipments, the expected frequency of transport, routes, and any special handling or service requirements. The tender request may be sent out to multiple potential service providers to invite them to submit bids by transmission through the user interface or other actions by the processor 104 as described further below.

Still referring to FIG. 1, user communication 112 may include carrier preferences, contracts, and rates, as well as information about other service providers involved in the transport chain, like warehouse operators or customs brokers. User communication 112 data may include performance feedback, incident reports, or service quality assessments. User communication 112 data may include login credentials, user 108 roles, and permissions data to ensure secure and authorized access to the system and its data.

Still referring to FIG. 1, processor 104 may be configured to retrieve one or more contact profiles 116. A "contact profile," as used herein, is data structure containing information associated with a person or entity. Contact profile 116 may include information of a carrier such as but not limited to a name, contact information, information associated with the company of the carrier, the types of the delivery the carrier is associated with, the transport vehicles available to and/or associated with the carrier and the like. Contact profile 116 may include information about the entity/organization/company to be transporting the goods. Contact profile 116 may further include current shipments of the carrier, invoices, payrolls, various fees, current loads, appointment scheduling, GPS tracking and the like. In some embodiment, contact profile 116 may be categorized into a user 108 contact profile 116 and a company contact profile 116, wherein the user 108 contact profile 116 is the profile of a person and the company contact profile 116 is that of a company. In some embodiments, contact profile 116 may include both the company and persons associated with the company in one data structure.

Still referring to FIG. 1, contact profile 116 my include a communication log. A "communication log," as used herein is a data structure containing communications received or associated with a contact profile 116. For example, the communication log may contain all emails ever received from a carrier. The communication log may be categorized and index the stored communications by the specific sender associated with the contact profile 116. For example one company under a contact profile 116 may have multiple people responsible for transporting goods, wherein each communication received by the carriers may be indexed according to the specific person's identification, contact information, login credential, and the like.

Still referring to FIG. 1, contact profile 116 may be received from a contact database. Databases, as disclosed herein, may be implemented, without limitation, as a relational database, a key-value retrieval database such as a NOSQL database, or any other format or structure for use as a database that a person skilled in the art would recognize as suitable upon review of the entirety of this disclosure. Databases may alternatively or additionally be implemented using a distributed data storage protocol and/or data structure, such as a distributed hash table or the like. Databases may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure. The contact database may be populated and indexed as a function of a input through the user interface. For example, a communication protocol may include a user 108 setting up user 108 credentials/log information which maty then be stored in the contact database.

Still referring to FIG. 1, contact profile 116 may be received through an application program interface (API) that is communicating with various carrier and/or transportation software. An "application program interface," as used herein, is a set of rules and protocols that allows different software applications to communicate with each other. It defines the methods and data formats that applications can use to request and exchange information. Processor 104 may be configured to communicate with external systems (like carrier databases or platforms) through the API. Contact profiles 116 received through the API may be indexed into the contact database.

Still referring to FIG. 1, processor 104 is configured to classify a user communication 112 to a contact profile 116. Classification may include a language processing model and/or with a classifier machine learning model. Processor 104 may preprocess user communication 112, removing irrelevant characters, correcting typos, standardizing text format, and tokenizing the text into words or phrases. Methods of preprocessing may include tokenization wherein, text is broken down into its constituent elements, or tokens. Methods of preprocessing may include lowercasing wherein text is converted to lowercase to ensure words like "Hello," "hello," and "HELLO" as the same word, maintaining consistency and reducing the feature space. Methods of preprocessing may include stripping out unnecessary or irrelevant characters, such as punctuation, special symbols, and numbers, which might not contribute to the message's overall meaning or intent. Methods of preprocessing may include the removal of stop words such as "is," "and," "the," which occur frequently across texts but usually don't carry significant meaning. Removing these words can help focus on more meaningful words in the text. Methods of preprocessing may include stemming and lemmatization, wherein words are reduced to their base or root form. Stemming cuts off prefixes and suffixes, while lemmatization considers the word's morphological analysis to bring it down to its base or dictionary form. For instance, "running" would be stemmed to "run," and "better" would be lemmatized to "good".

Still referring to FIG. 1, after preprocessing user communication 112, processor 104 may implement a feature extraction algorithm using a language processing model to extract transportation management system (TMS) contextual data such as relevant features, key words, and the like. For example, a natural language processing (NLP) model may use in identifying key words, phrases, or other linguistic patterns indicative of the message's intent or content. A feature extraction algorithm may include vectorization, wherein the preprocessed text is converted into a numerical format that machine learning algorithms can work with. Vectorization may be performed using techniques like Bag of Words or TF-IDF, which create a vector (array of numbers) representing the presence or frequency of words in the text. Advanced models, like neural networks, may word embeddings (like Word2Vec or GloVe) that provide a dense representation capturing semantic meaning. Bag of Words involves creating a vocabulary of all the unique words across the text corpus and then transforming each text into a vector. Each vector has the same length as the vocabulary, with each element representing the presence or frequency of the corresponding word in the text. This method captures the occurrence of words but not their order or context. TF-IDF (Term Frequency-Inverse Document Frequency) modifies the Bag of Words approach by weighting each word's frequency in a document against its frequency across all documents. This highlights words that are frequent in a particular document but not common across others, helping to emphasize unique terms that could be more informative for classification.

Still referring to FIG. 1, after vectorization, processor 104 may implement a contact classifier, a machine learning model configured to classify user communication 112 to a contact profile 116. The contact classifier training data may include historical data correlating user communication 112, such as TMS contextual data, to contact profiles 116. For example, training data may include a set of messages and their corresponding classifications such as the correct carrier or contact profile 116 each message should be associated with. Training data may additionally include features (words, phrases, or other text attributes) indicative of a plurality of contact profiles 116. For example, certain key words may be strong indicators of a particular contact profile 116 over other profiles. Additionally, the contact classifier may utilize clustering algorithms and unsupervised training methods to enhance its effectiveness. For example, the contact classifier may implement a k-means clustering algorithm to group similar user communications based on their features, such as the presence of specific keywords or phrases. By clustering similar user communications together, the contact classifier may identify patterns and similarities in the data, enabling more accurate categorization of messages in user communication 112 into contact profiles. Unsupervised training methods may include implementing an unsupervised learning algorithm to identify underlying patterns and structures within user communications without relying on explicit labels or classifications. An unsupervised learning algorithm may partition user communications into clusters. The contact classifier may use the training data derived from the unsupervised learning algorithm to categorize user communications into contact profiles. For example, the contact classifier may assign a new email or chat message to the cluster that most closely matches its features, indicating the corresponding contact profile associated with the message. Furthermore, the contact classifier may output a probability score along with the categorization of user communication 112 to a contact profile 116. A probability scores represents the likelihood that the user communication 112 belongs to a contact profile 116.

Still referring to FIG. 1, the contact classifier may include a Convolutional Neural Network (CNN) or a Recurrent Neural Network (RNN) to generate the probability score. For example, a CNN may include a SoftMax function on the output/final layer of the network that converts the raw output scores (logits) from the network into probabilities by taking the exponential of each output and then normalizing these values by dividing by the sum of all exponentials. The result is a vector where each component represents the probability of the corresponding class, with all probabilities summing up to 1. For a given user communication 112, after all the transformations and computations through the network's layers, the softmax layer may output the probability distribution across all possible contact profiles 116. The contact profile 116 with the highest probability is may be used as the output of the machine leaning model. In some embodiments, a decision threshold may be implemented wherein a set probability score must be met in order for the classification of the user communication 112 to be outputted.

Still referring to FIG. 1, processor 104 may be configured to update the communication long of the corresponding contact profile 116 by adding the user communication 112 of contextual data of the user communication 112. For example, a first user 108 may associated with the contact profile 116 and the user communication 112, processor 104 may log the user communication 112 under the communication log of the first user 108 by adding the date and time of the message and embedding message into the contact profile 116 data structure.

Still referring to FIG. 1, processor 104 is configured to classify TMS contextual data to an action table within a repository 120. A "repository," as used herein, is a central data structure or database where data, documents, or other items are stored and managed. A repository 120 may serve as a common reference point that multiple parties can access to retrieve or contribute information relevant to the communication process. A repository 120 may include a database, or a storage location as described herein. For example, contact database may be included in a repository 120. An "action table," as used herein, is a data structure containing contextual data necessary for executing specific tasks. The action table may be organized into rows and columns, where each row represents a unique instance of an action to be analyzed or decided upon, and each column represents different attributes or pieces of contextual data relevant to those actions. In other embodiments, there may be a plurality of action tables categorizing data to a specific task, rather than one table categorizing data to a variety of tasks. For example, repository 120 may include a quote generating action table, a load generating action, a chat response generating action table, and the like. The action table is tailored to store data that is directly relevant to the tasks a machine learning model(s) is designed to perform. The contextual data stored in the action table may be used to train a corresponding machine learning model. During training, a machine learning model learns to associate patterns in the contextual data with the correct actions or outcomes. An action table may also include an action rule(s). An "action rule," a used herein is a protocol that outlines the steps and procedures necessary for the processor 104 to deploy and manage an action. The action rule may serve as a comprehensive guide to ensure that a machine learning model is integrated seamlessly into apparatus 100 and operates as intended to achieve specific outcomes. The action rule may outline procedures for gathering, cleaning, and preprocessing data. This may include identifying data sources, handling missing data or outliers, and transforming data into a format suitable for the model. The action rule may document the criteria for selecting a machine learning model that best suits the defined objectives. This may involve choosing between models like neural networks, decision trees, or support vector machines based on the problem type, accuracy requirements, and computational efficiency. The action rule may specify the process for training the model, including setting parameters, choosing a training algorithm, and defining how training data will be fed into the model. This may also detail how to evaluate the model's performance using metrics like accuracy, precision, recall, and F1-score. The action rule may describe the methods for validating and testing the model to ensure it meets the performance criteria without overfitting or underfitting. This may involve techniques like cross-validation, using a holdout data set, or applying the model to real-world scenarios to test its robustness.

Still referring to FIG. 1, the action table serves as a vital component, organizing and categorizing detailed action rules for various operational tasks. For example, an action rule may direct the machine learning model to optimize routing between Chicago and New York for a user 108. The action rule may detail the procedural steps for assessing different transportation modes like rail, truck, and cargo ship, considering factors such as cost efficiency, transit times, and environmental impact. Each action rule in an action table(s) may be associated with specific contextual data, like historical traffic patterns and seasonal weather conditions. By maintaining this structured repository 120, the action table ensures that the machine learning model has immediate access to precise, task-specific protocols. This arrangement enhances the model's ability to dynamically optimize transport schedules and routes, significantly improving operational efficiency and decision accuracy in the intermodal transport framework.

Still referring to FIG. 1, classifying TMS contextual data to an action table(s) may include implementing language processing methods as described above to identity keywords or phrases associated with an action table and action rule. For example, processor 104 may use a k-Nearest Neighbors (k-NN) algorithm to categorize incoming user 108 queries of user communication 112. First, each query may be preprocessed (tokenized, cleaned of stop words, and vectorized using TF-IDF) to convert text into a numerical format that the algorithm can process. Processor 104 may maintain a repository 120 of previously categorized queries as part of an action table, each labeled with categories such as "Billing Issues," "Schedule Inquiries," or "Shipping Damage." When a new query arrives, the k-NN algorithm calculates the similarity between this new query and all others in the dataset, identifying the k closest queries based on their vector distances. The majority category among these k neighbors determines the classification of the new query. For example, if the new query is closest to other queries mostly categorized under "Schedule Inquiries," it will be automatically categorized under the same, ensuring it is swiftly routed to the appropriate department for a quick response.

Still referring to FIG. 1, in another example, processor 104 may implement a Support Vector Machine (SVM) algorithm to classify and route a user communication 112, such as complaints based on their content. Processor 104 may preprocess all incoming messages by cleaning the text, removing stop words, and using TF-IDF to transform the textual data into a high-dimensional feature space. Each message may then be input into the SVM, which has may be trained on a large dataset of previously categorized complaints such as "Late Deliveries," "Damaged Goods," or "Customer Service Issues." The SVM is effective due to its ability to handle high-dimensional data and its robustness in distinguishing between different classes by finding the optimal hyperplane that maximizes the margin between the classes. Once a new complaint is received, the SVM may classify it into one of the predefined categories, ensuring that it is directed to the appropriate department. This not only streamlines the response process but also helps in prioritizing actions based on the severity and nature of the complaints, enhancing overall customer satisfaction and operational efficiency.

Still referring to FIG. 1, in another example, processor 104 may implement a machine learning model, such as an action classifier 124 configured to receive keywords of phrase extracted from a user communication 112 as described above and classify them to an action table. The training data for the action classifier 124 may include data correlating keywords and phrases to a plurality of action tables. For example, a request stating "urgent rescheduling of delivery from April 5 to April 10 due to supplier delay" be may be categorizing scheduling change action table. Additionally the training data may include features extracted from user communications correlated to a plurality of action tables. Features may encompass a broader range of information, including linguistic patterns, sentiment analysis, metadata (such as sender information or message timestamps), and contextual cues. For example, features may include the presence of specific language indicating urgency, the sentiment conveyed in the message (positive, negative, or neutral), or the frequency of certain words or phrases related to specific actions. The action classifier may also implement clustering algorithms to categorize user communications based on similarities in their features as describe above. For example, communications expressing requests for rescheduling deliveries due to supplier delays may form a distinct cluster, while communications related to quote generation or load management may form separate clusters. By implementing clustering algorithms, the action classifier may identify underlying structures in user communications to effectively categorize to the appropriate action table.

Still referring to FIG. 1, classifying TMS contextual data to an action table(s) may include ranking TMS contextual data based on urgency or priority. For example, a machine learning model may be configured to classify incoming requests based on urgency levels, such as 'urgent', 'high priority', 'normal', or 'low priority'. This classification may be based on keywords, context (e.g., proximity of the requested date to the current date), and historical behavior patterns of the requestor. Alongside urgency, the machine model may also categorize tasks by type, such as 'date change', 'time change', or other specific modifications. The machine learning model training data may include TMS contextual data and contact profiles correlated to urgency levels. For example, requests from key accounts or those impacting a larger number of subsequent operations may automatically receive a higher priority. Similarly, compliance with legal or contractual deadlines can also dictate the prioritization of tasks. Processor 104 and/or the machine learning model may utilize optimization algorithms to dynamically adjust the priority based on real-time data inputs. For example, if a delay occurs due to unforeseen circumstances like weather or mechanical failures, the processor 104 may automatically elevate related change requests in priority. An optimization algorithm may include linear programming (LP). For example, LP may be employed to prioritize scheduling tasks by defining variables representing the start time of loading or unloading for each cargo shipment. The LP model may aim to minimize total wait time while respecting resource capacities and operational constraints. By solving the LP model, processor 104 generates an optimal schedule that prioritizes tasks based on minimizing wait times, ensuring timely processing of cargo, and maximizing operational efficiency within the terminal. An optimization algorithm may include inter programming (IP). For example, the objective may be to minimize the total time to complete all deliveries while meeting delivery deadlines and prioritizing urgent shipments. IP may be utilized to prioritize scheduling tasks by defining variables representing the assignment of trucks to delivery routes, considering start times and durations. The IP model may aim to minimize total delivery time while meeting delivery deadlines and prioritizing urgent shipments. By solving the IP model, processor 104 generates an optimal schedule that prioritizes scheduling tasks based on minimizing total delivery time, ensuring efficient delivery operations, and timely fulfillment of customer orders.

Still referring to FIG. 1, ranking TMS contextual data based on urgency or priority may include, after classification to an action table, flagging the action table in sequence of priority. The action table entries may be flagged or marked with a priority level indicator, such as urgency levels as described above. Entries deemed to be of higher urgency or priority may receive a higher priority flag, while less urgent tasks are flagged accordingly. The action table entries may then be sorted or sequenced based on the priority flags assigned to each entry. An entry may refer to a grouping on TMS contextual data with a specific task and action rule. Entries with higher priority flags are positioned at the top of the sequence, indicating that they require immediate attention or action, while lower priority tasks are positioned further down the list. Priority level indicators serve as visual cues or markers attached to each task or entry within the action table, helping processor 104 quickly identify and prioritize tasks based on their urgency or importance. These indicators may include labels, symbols, or color codes that signify the priority level assigned to each task. Tasks flagged as high priority may require immediate attention or action due to their critical nature or time sensitivity. These tasks are may marked with a red label or symbol to signify their urgency. For example, a user communication 112 indicating a delivery delay impacting a crucial shipment might be flagged as high priority to ensure prompt resolution. Tasks of medium priority may not require immediate action. These may be marked with a yellow label or symbol to indicate that they should be addressed after high priority tasks are resolved. For instance, a customer inquiry about delivery status may be classified as medium priority. Tasks with low priority are non-urgent or routine in nature and can be addressed later. They may be marked with a green label or symbol to signify their lower importance. For example, a request for general information or a routine maintenance task might be classified as low priority. Some tasks may not have a priority level assigned to them if they are not time-sensitive or critical. These tasks may be left unflagged or marked with a neutral color to indicate their status.

Still referring to FIG. 1, is some embodiments, classifying TMS contextual data to an action table(s) may include receiving additional using a chatbot as described above. For example, when a user 108 interacts with the user interface, the chatbot may be activated to engage with the user 108, acknowledging receipt 148 of the user communication 112. Upon receiving the user 108's input, the chatbot may perform an initial analysis to understand the nature of the request. However, if the request lacks sufficient detail or is ambiguous, the chatbot recognizes the need for additional clues or data to proceed accurately. The chatbot may recognize the need for additional clues or data through a combination of predefined rules and natural language processing (NLP) techniques. For example, if user communication 112 lacks specific details necessary for accurate classification, the chatbot's rule-based system may trigger a response indicating the need for more information. A rule-based system in a chatbot operates on predefined if-then statements that dictate the bot's behavior and responses. Each rule consists of a condition, specifying criteria like keywords or patterns in the user 108's input, and an associated action, defining what the bot should do if the condition is met. In some embodiments, rules may be prioritized to resolve conflicts or handle overlapping scenarios, and mechanisms for learning and adaptation may be incorporated to refine rules over time based on user 108 interactions and feedback. This structured approach enables the chatbot to effectively manage conversation flow and provide meaningful interactions with users 108. In an example, one rule may state that if a user 108 mentions "urgent delivery" in their message, the condition is triggered, and the action prompts the chatbot to inquire about the delivery destination and required delivery date. Another rule may specify that if a user 108 asks about tracking a shipment, the chatbot retrieves the tracking information from a database and provides it to the user 108. Additionally, a priority rule may ensure that urgent requests are addressed before non-urgent inquiries. For instance, if a user 108 asks about shipment tracking but also mentions an urgent delivery request, the system prioritizes the urgent delivery inquiry and responds accordingly. As users 108 interact with the chatbot and provide feedback, the system refines its rules and priorities to improve accuracy and user 108 satisfaction over time. This rule-based approach allows the chatbot to efficiently handle a variety of user 108 queries and provide timely assistance in navigating the transportation management system. The chatbot may maintain a conversational tone to facilitate smooth interaction and ensure user 108 comfort. Once the user 108 provides additional clues or data, the chatbot re-evaluates the request based on the updated input, refining its classification using natural language understanding (NLU) capabilities. Based on this refined classification, the chatbot routes the request to the appropriate action table or action rule using the methods as describe above, ensuring it is directed to the relevant department or process for further action. Additionally, the chatbot may provide confirmation to the user 108 that the user communication 112 has been successfully classified and routed, offering additional assistance or resources if needed to ensure a positive user 108 experience.

Still referring to FIG. 1, apparatus 100 may include a collection of machine-learning models 128a, 128b, 128c, 128n for performing specific actions based on the action rule. Collection of machine-learning models 128a, 128b, 128c, 128n may include a quote generation machine learning model configured to auto generate a quote in response to a user communication 112. Training data may include data correlated TMS contextual data to quote responses. Quote generation machine learning model may receive as input contextual data form actional table as described above. For example, contextual data may include keywords or phrases from a quote request encompassing shipment specifics like origin, destination, and dimensions, alongside critical factors such as delivery deadlines and cargo type. "Contextual data," as used herein, is data that provides background or situational understanding, typically surrounding a specific event, task, or interaction. Quote generation machine learning model employ various regression techniques, such as linear regression, decision trees, or ensemble methods like random forests, to discern intricate patterns and relationships between the contextual data and quote prices. Once trained, quote generation machine learning model may predict quote prices for new shipments, leveraging its learned knowledge from the action rule to finalize and deliver the generated quote. The action rule may involve identifying available carriers, calculating transportation costs, and formulating a formal quote document with pricing details. Processor 104 may output the generated quote through the user interface such as the chatbot.

Still referring to FIG. 1, in another embodiment, collection of machine-learning models 128a, 128b, 128c, 128n may include a load generation machine learning model configured to automatically generate loads functions through a structured process. Initially, load generation machine learning model may collect contextual data from action table, encompassing details such as shipment specifics like origin, destination, and cargo details as an input. The contextual data may include the type of goods, quantity, pickup and delivery locations, as well as any special handling requirements. Load generation machine learning model trained on historical data to learn patterns and relationships between the keyword or phrases of the contextual data and the occurrence of tender requests and load generation. This training process enables the model to accurately detect tender requests and automatically generate corresponding loads based on the contextual data provided. For example, historical data may include a pattern wherein tender requests for perishable goods originating from a specific region often coincide with requests for expedited delivery services. Load generation machine learning model may learn to associate certain contextual cues with the likelihood of tender requests and the corresponding requirements for load generation. "Load generation," as used herein, refers to the process of creating or assigning shipments to carriers or transport vehicles based on specific criteria and constraints. This process may include determining which shipments will be assigned to which carriers or vehicles, considering factors such as shipment characteristics (e.g., size, weight, type of goods), pickup and delivery locations, carrier availability and capacity, as well as any special requirements or preferences. Load generation aims to optimize the allocation of resources, minimize transportation costs, and ensure timely and efficient delivery of goods. It may be performed manually by logistics professionals or automatically by software systems, such as transportation management systems (TMS), using algorithms and optimization techniques to streamline the process.

Still referring to FIG. 1, in generating a load, load generation machine learning model may use data received through APIs, as described above, to validate and confirm load generation before proceeding with the allocation of shipments to carriers or transport vehicles. For example, the model may initiate API calls to external systems such as carrier databases or logistics platforms to gather crucial information on carrier availability, capacity, and service offerings. These API interactions serve to validate various constraints associated with load generation, including carrier availability, equipment compatibility, regulatory compliance, and service level agreements. Armed with this validated information, load generation machine learning model may make informed decisions regarding load generation in response to a tender request, ensuring that proposed loads meet all necessary criteria and constraints. This integration of machine learning and API technology enhances the efficiency and accuracy of load generation processes, ultimately optimizing resource allocation and enhancing overall transportation operations.

Still referring to FIG. 1, collection of machine-learning models 128*a*, 128*b*, 128*c*, 128*n* may include a response machine learning model configured to autonomously craft responses, such as load status or system management related updates. Response machine learning model may receive and be trained with TMS data from related to a plurality of parties and processes in the intermodal transport business. TMS data encompasses a wide range of information related to the management and tracking of shipments and logistics operations. This includes data points such as the status of a load, which refers to the current state or condition of a shipment within the transportation process. The status of a load may include details such as whether the shipment is in transit, at a warehouse for processing, awaiting pickup or delivery, or has been successfully delivered to its destination. Additionally, TMS data may include real-time updates on factors impacting the load's status, such as delays, route changes, or issues with carriers or transport vehicles. TMS data may include digital copies of shipping documents, such as bills of lading, packing slips, customs paperwork, and proof of delivery documents. TMS data may include key performance indicators (KPIs) and metrics related to transportation operations, such as on-time delivery performance, carrier utilization rates, transit times, and dwell times. TMS data may be received through API integration as described above. TMS may be retrieved and stored in the repository 120 in a TMS data table or contact database.

Still referring to FIG. 1, response machine learning model may receive the processed user communication 112/TMS contextual data, as in the extracted and/or classified keywords and phrases, as and input and analyze the TMS data received from the repository 120 or actively retrieved via APIs and output a response, such as confirming load status updates in real time. This integration fortifies the accuracy of responses by ensuring the latest information is incorporated. Once equipped with a comprehensive understanding of the inquiry, the model may craft personalized replies, tailoring information based on the user's 108 specific query and incorporating pertinent details retrieved from the TMS data, such as estimated delivery times or potential delays. Through a continuous feedback loop, the response machine learning model may refine its responses over time, adapting to evolving communication patterns and user 108 preferences. Response machine learning model may be communicatively connected with the chatbot, wherein the output of the model may be fed into the LLM of the chatbot to output the response to the user communication 112 through the user interface. For example the output of response machine learning model may state "the shipment XYZ123 is in transit and expected arrival 10:00 AM tomorrow." A chatbot may reword the output for stylistic purposes in to "Hello! Your shipment with tracking number XYZ123 is on its way and scheduled to reach the destination warehouse by 10:00 AM tomorrow. Everything is running smoothly with no reported delays or issues from the carrier's end." The message may be personalized with a friendly greeting, concise delivery details, and a positive tone to reassure the user 108 about the status of their shipment. Additionally, the chatbot may incorporate branding elements or customized responses based on user 108 preferences or previous interactions to enhance the overall user 108 experience Still referring to FIG. 1, collection of machine-learning models 128*a*, 128*b*, 128*c*, 128*n* may include plurality of machine learning models configured to perform a specific task in response to a user communication 112. Repository 120 may include a training set table wherein a plurality of training dataset s may be categorized by a specific function or action rule. Processor 104 may select a training dataset based on the action rule to training machine learning model with to perform a task. In some embodiments, processor 104 may establish a selection criteria based on the user communication 112 analysis and action rules, encompassing factors like relevance, similarity to past inquiries, data diversity, and performance metrics. Subsequently, processor 104 may prioritize available training datasets in line with the selection criteria, favoring those closely matching the inquiry of the user communication 112 requirements and exhibiting successful past performance. Employing a selection algorithm, such as similarity analysis or classification, processor 104 may identify the most suitable dataset from the prioritized list. A similarity analysis may employ diverse similarity metrics, like cosine similarity or Jaccard similarity, to quantify the resemblance between the inquiry of the user communication 112 and the training dataset's content. By computing similarity scores, processor 104 may gauge the relevance of each dataset to the user 108's inquiry.

Still referring to FIG. 1, processor 104 is configured to answer user communication 112. An answer may include performing a corresponding action based on an action rule and/or configuration of machine learning modal as described above. In some embodiments, answering user communication 112 may include generating an outbound communication 132. An "outbound communication," as used herein, is communication transmitted by a processor 104. An outbound communication 132 may include questions asked by the chatbot, responses to user communication 112, and the like. Outbound communication 132 may include outputs of the plurality of machine learning models as described above.

Still referring to FIG. 1, generating outbound communication 132 may include generating one or more executable codes 136 to perform a specific action in relation to a user's 108 request in user communication 112. An "executable code," also referred to as a code, is a set of instructions written in a programming language that a computer can understand and execute. It may include set of commands, statements, and logic that define the desired behavior or actions to be performed by a computer program. For example, user communication 112 may be classified to an action rule related to updating a delivery schedule in a calendar user interface of a TMS hub/platform/system 140 that processor 104 is communicatively connected to. A TMS hub/platform/system 140 including a scheduling/calendar interface may include TMS user interfaces, databases, and structures as disclosed in Non-provisional application Ser. No. 18/584,209 filed on Feb. 22, 2024, and entitled "APPARATUS AND METHOD FOR COMMUNICATION WITH AN INTERMODAL TERMINAL," and Non-provisional application Ser. No. 18/584,304 filed on Feb. 22, 2024, and entitled "SYSTEMS AND METHOD FOR GENERATING A SYNTHESIZED DATABASE," the both of which are entirely incorporated herein by reference. Executable codes 136 may perform a wide range of tasks, from simple arithmetic calculations to complex data processing, user interface interactions, and system operations. Codes may be configured to manipulate data, interact with external systems and devices, and control the flow of program execution based on conditional logic and user 108 input. Examples of executable code 136 include scripts written in languages like Python, JavaScript, and Ruby, as well as compiled programs written in languages like C, C++, and Java. Processor 104 may transmit the code in outbound communication 132 to a plurality of systems communicatively connected to apparatus 100 to perform the outputs of the machine learning model as described above.

Still referring to FIG. 1, codes 136 may be configured to update delivery schedules, a mentioned above, generate and send invoices, trigger alerts or escalations for user requests in user communication 112, process payment transactions, generate reports or analytics based on data collected from user communications, integrate external systems or APIs to retrieve additional information or perform supplementary actions, and the like. Codes may be configured to perform tasks and actions as described in Non-provisional application Ser. No. 18/584,209. Generation of code 136 may be action rule based. Action rules may be stored in the action table, outlining the steps and procedures necessary to perform specific actions in response to incoming communications. The code generation process may involve processor 104 interpreting these action rules and translating them into executable code. For example, if a user communication 112 triggers an action rule related to updating a delivery schedule, processor 104 may generate code that interacts with the scheduling/calendar interface to make the necessary changes.

Still referring to FIG. 1, generation of code 136 may be template based. Processor 104 may have preexisting code templates for actions or tasks stored in repository 120. For example user communication 112 may be classified to an action rule that enables processor 104 to implement a template for code 136 generation. Processor 104 may fill in the relevant details from the communication into the template to generate the executable code. For example, if a user request in user communication 112 involves generating an invoice, processor 104 may use a template that includes the necessary logic for invoice generation and customization based on the specific transaction details.

Still referring to FIG. 1, generation of code 136 may include machine learning. Processor 104 may use machine learning algorithms to analyze patterns in incoming user communications 112 and automatically generate code 136 based on learned associations between communication characteristics and corresponding actions. For example, processor may train a code classifier with training data correlating processed user communications (such as keywords and phrases as described above) to code templates and categories of codes. A code category may refer to the specific action or task the code is to be configured for. For example, if user communication 112 includes a scheduling change request, the code classifier may analyze the content of the message and classify it as belonging to the "scheduling change" code category. Based on this classification, processor 104 may then generate the code to update the delivery schedule in a TMS platform. In some embodiments, code 136 may be generated using an LLM. LLM may be consistent with any LLM disclosed throughout this disclosure. In some embodiments, LLM may receive as input one or more action rules. LLM may, in some embodiments, output code 136 that implements one or more of those action rules. In some embodiments, LLM may be specifically trained for code generation on a corpus of training data comprising segments of code.

Still referring to FIG. 1, generating an outbound communication 132 may include transmitting a request for third party 144 input in relation to the context a user communication 112. For example, user communication 112 may contain a request for processor 104 to switch drop off times of a load at a drop off terminal. An action rule classified to user communication 112 may include processor 104 receiving third party 144 approval, denial, or other form of input before generating and transmitting the code as described above. A third party 144 may include an authoritative figure or department. A third party 144 may include one or more individuals in the same grouping or independently associated with a department. A third party 144 may include a terminal operator. Terminal operators, such as DP World or APM Terminals, manage terminal facilities and handle container operations, including loading, unloading, and storage. A third party 144 may include authoritative figure, such as a supervisor, of the user 108 as documented in the contact profile 116. A third party 144 may include operations managers of trucking companies, custom authorities, port authorities and the like. Processor 104 may generate the outbound communication 132 to include details such as the current drop-off schedule, the proposed changes, and any relevant contextual information about the load and its transportation requirements. Processor 104 may retrieve relevant information such as the current drop-off schedule through repository 120 or APIs as described above. The processor 104 may identify the appropriate third party 144 to whom the request should be sent based on the action rule. In some embodiments, processor 104 may implement a machine learning to identify a third party 144 absent from the action rule. Processor 104 may train a third party 144 identification machine learning model with training data including examples of user communications correlated to the type of corresponding third parties or contact profiles involved in handling the user communication. Processor 104 may ensure that the training data covers a wide range of scenarios and edge cases to account for variability in user 108 requests/transmissions and contextual factors. For example, the training data may include examples where the appropriate third party 144 is not immediately obvious or where multiple third parties may need to be involved. The third party 144 identification machine learning model may receive the processed user communication 112 as an input and output the contact information/profile of the third party 144. Communication to a third party 144 may be thorough the user interface as described herein or any form of electronic communication, such as email, text, and the like.

Still referring to FIG. 1, generating an outbound communication 132 may include receiving and forwarding the third party 144 input to a user 108. For example, a third party 144 may the deny the schedule change request of the user communication 112 wherein the chatbot of the use interface may communicate a message to the user 108 indicating the denial. In some embodiments, generating an outbound communication 132 may include transmitting a receipt 148 to a user 108 and/or corresponding third parties. A "receipt 148," as used herein, is a documentation indicating the status to a requested action. For example a receipt 148 may document the confirmation or denial of a requested action for processor 104 to perform. The receipt 148 may also include disclosure of request pending approval from the corresponding third parties. The receipt 148 may include a timestamp indicating the date and time when the request was received, approved, or denied. The receipt 148 may include details of the original user 108 request, including the nature of the request, any specific instructions or requirements, and relevant context or information provided by the user 108. The receipt 148 may include details of the specific actions taken by the processor 104 to fulfill the user 108 request. This may include details of any modifications made, tasks completed, or processes executed to address the user 108's needs. The receipt 148 may provide information about the result or outcome of the completed action. For example, in the case of a scheduling change, it may confirm the new appointment time or date. In some embodiments, processor 104 require confirmation or acknowledgment of the receipt 148 from the user 108 or third party 144 to indicate their acceptance of the completed action.

Still referring to FIG. 1, generating an outbound communication 132 may include using an LLM as described above. Processor 104 may generate input data for the LLM that captures the context of a user's request. For example, the input data may include information such as the user's request to switch drop-off times for a load at a terminal, along with relevant details about the load, current schedule, and any proposed changes. The LLM may then process the input data to generate a coherent and contextually appropriate message to be sent to the corresponding third party. For example, the LLM may generate a message requesting approval for the schedule change, providing all necessary details and justifications.

Still referring to FIG. 1, generating an outbound communication 132 may include using a communication template. For example, if outbound communication 132 is a request for approval from a terminal operator, the communication template may include standard language for such requests, along with placeholders for specific details like the load ID, current schedule, and proposed changes. Processor 104 may use a communication template classifier to match user communication 112 to a communication template. The communication template classifier may be trained on a dataset correlating different types of outbound communications to communication templates. Each communication template may be associated with specific attributes or features that describe its purpose, tone, and content. The input data may be various elements of user communication 1112 such as keywords, phrases, and structural characteristics that convey the purpose and context of the communication. During the training, the communication template classifier may learn to identify patterns in the input data that indicate which template is most appropriate for a given communication. For example, a request for approval from a terminal operator may contain keywords related to scheduling changes and terminal operations.

Still referring to FIG. 1, if further clarification or action is required based on the responses received to the outbound communication 132, processor 104 may initiate additional iterations of outbound communication 132 to address any outstanding issues or follow up on unresolved matters. This iterative approach allows for effective communication and resolution of user 108 requests within the system. For example, processor 104 may transmit a follow up communication seeking additional details, providing supplementary information, or requesting specific actions to be taken. The follow up communication may also include proposing alternative solutions to resolve the matter effectively. Generating alternative solutions, such as scheduling recommendations, may include methods as disclosed in Non-provisional application Ser. No. 18/584,209. As a feedback loop, the processor 104 may monitor and track the progress of each follow up communication to ensure that the resolution process is moving forward effectively. This may involve documenting responses, tracking timelines, and maintaining a clear record of communication exchanges in contact profiles or other components of repository 120 as described above.

Figure 2:
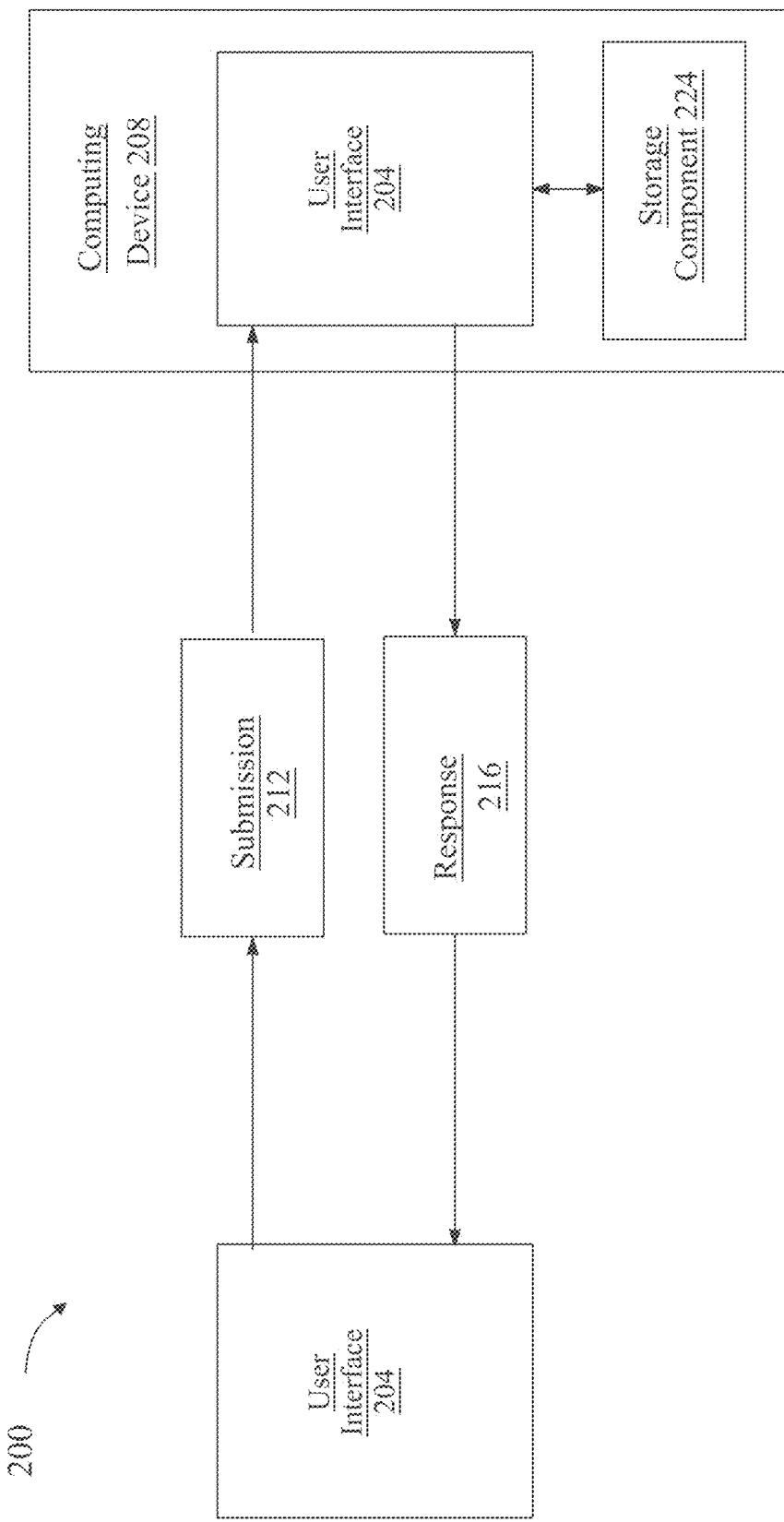
FIG. 2 is a diagram of an exemplary chatbot.

Referring to FIG. 2, a chatbot system 200 is schematically illustrated. According to some embodiments, a user interface 204 may be communicative with a computing device 208 that is configured to operate a chatbot. In some cases, user interface 204 may be local to computing device 208. Alternatively or additionally, in some cases, user interface 204 may remote to computing device 208 and communicative with the computing device 208, by way of one or more networks, such as without limitation the internet. Alternatively or additionally, user interface 204 may communicate with user device 208 using telephonic devices and networks, such as without limitation fax machines, short message service (SMS), or multimedia message service (MMS). Commonly, user interface 204 communicates with computing device 208 using text-based communication, for example without limitation using a character encoding protocol, such as American Standard for Information Interchange (ASCII). Typically, a user interface 204 conversationally interfaces a chatbot, by way of at least a submission 212, from the user interface 208 to the chatbot, and a response 216, from the chatbot to the user interface 204. In many cases, one or both of submission 212 and response 216 are text-based communication. Alternatively or additionally, in some cases, one or both of submission 212 and response 216 are audio-based communication.

Continuing in reference to FIG. 2, a submission 212 once received by computing device 208 operating a chatbot, may be processed by a processor 220. In some embodiments, processor 220 processes a submission 212 using one or more of keyword recognition, pattern matching, and natural language processing. In some embodiments, processor employs real-time learning with evolutionary algorithms. In some cases, processor 220 may retrieve a pre-prepared response from at least a storage component 224, based upon submission 212. Alternatively or additionally, in some embodiments, processor 220 communicates a response 216 without first receiving a submission 212, thereby initiating conversation. In some cases, processor 220 communicates an inquiry to user interface 204; and the processor is configured to process an answer to the inquiry in a following submission 212 from the user interface 204. In some cases, an answer to an inquiry present within a submission 212 from a user device 204 may be used by computing device 104 as an input to another function, for example without limitation at least a feature or at least a preference input.

Figure 3:
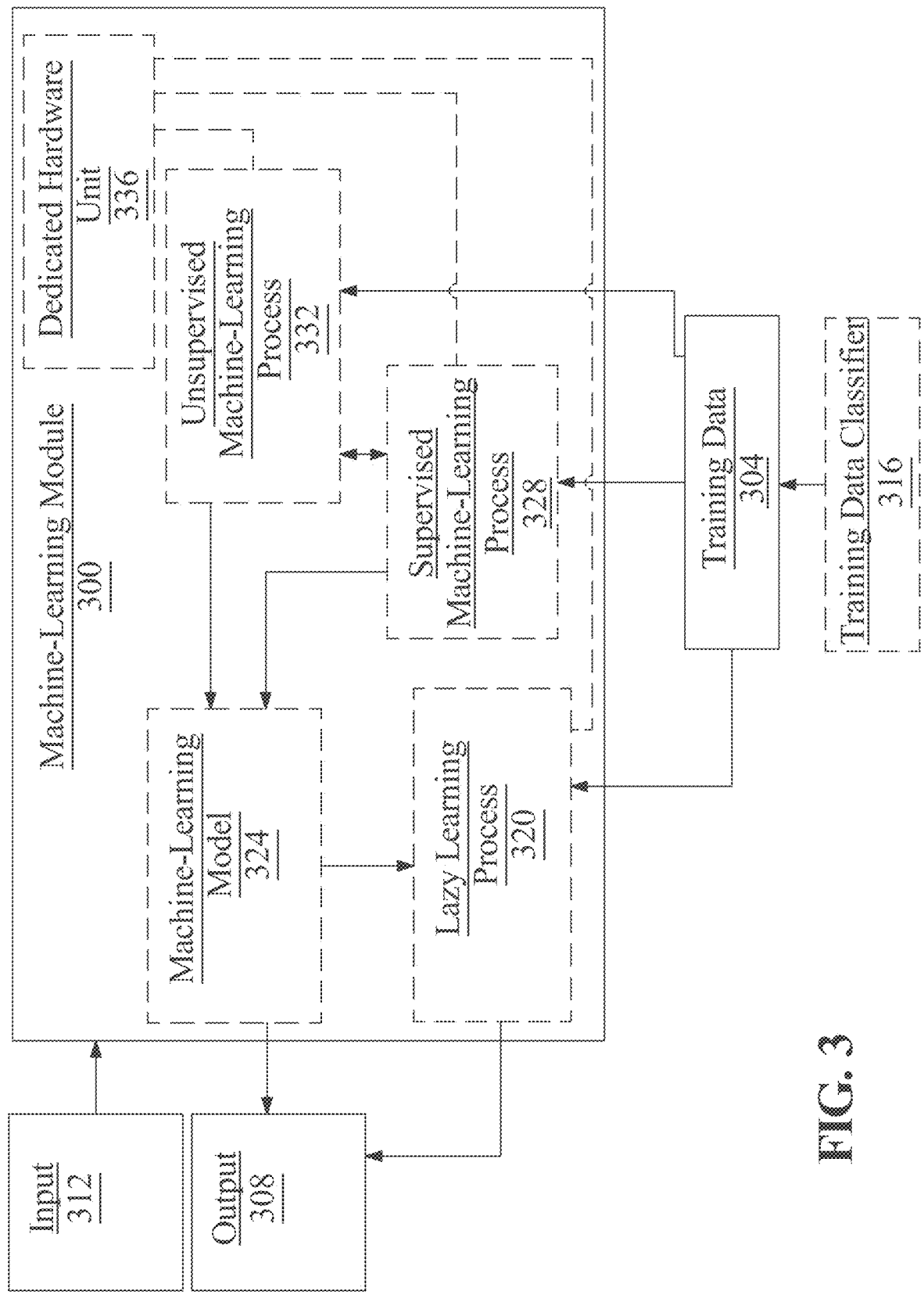
FIG. 3 is a box diagram of an exemplary machine learning model.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 3, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)$ $P(A)+P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity, and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max} : X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the 25$^{th}$ percentile value and the 50$^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs as described in this disclosure as inputs, outputs as described in this disclosure as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
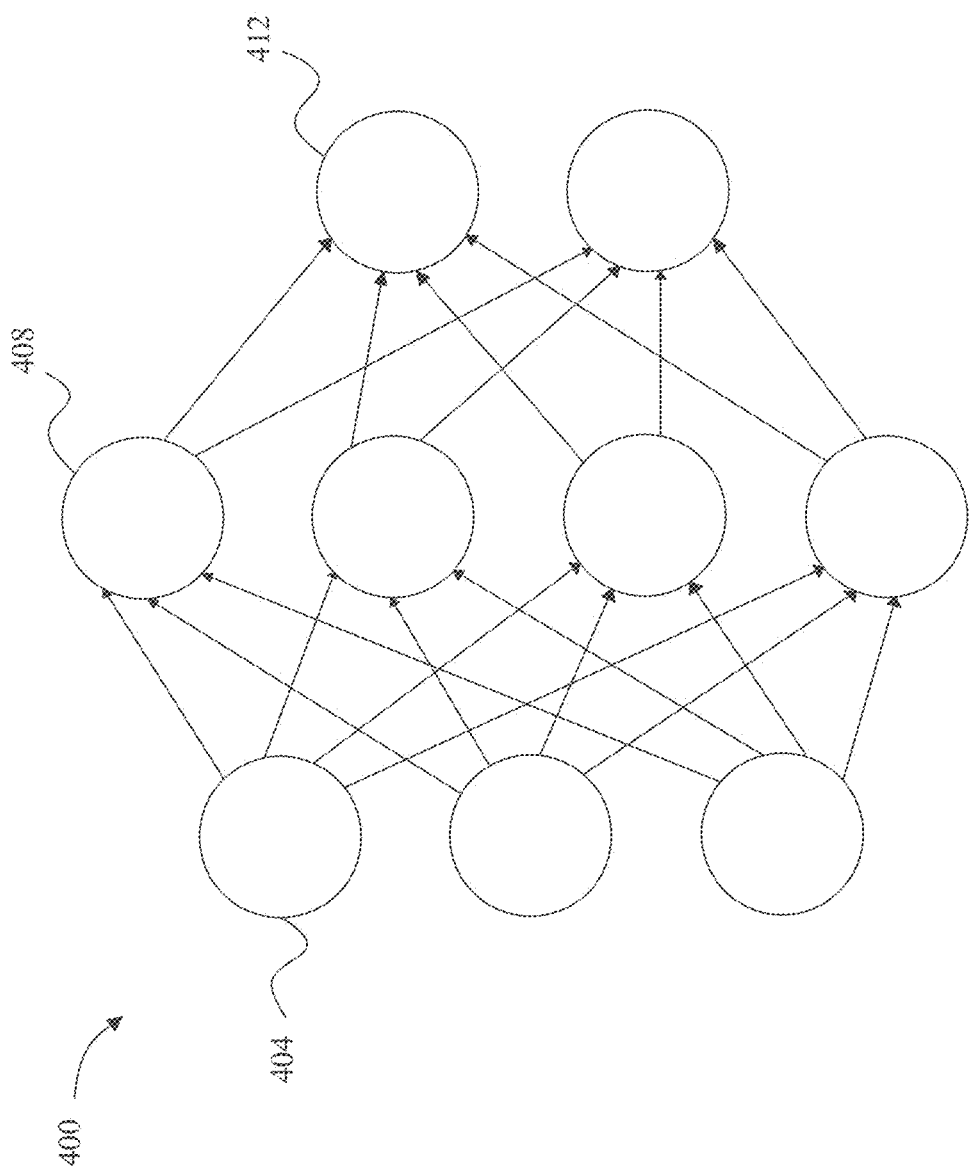
FIG. 4 is a diagram of an exemplary neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
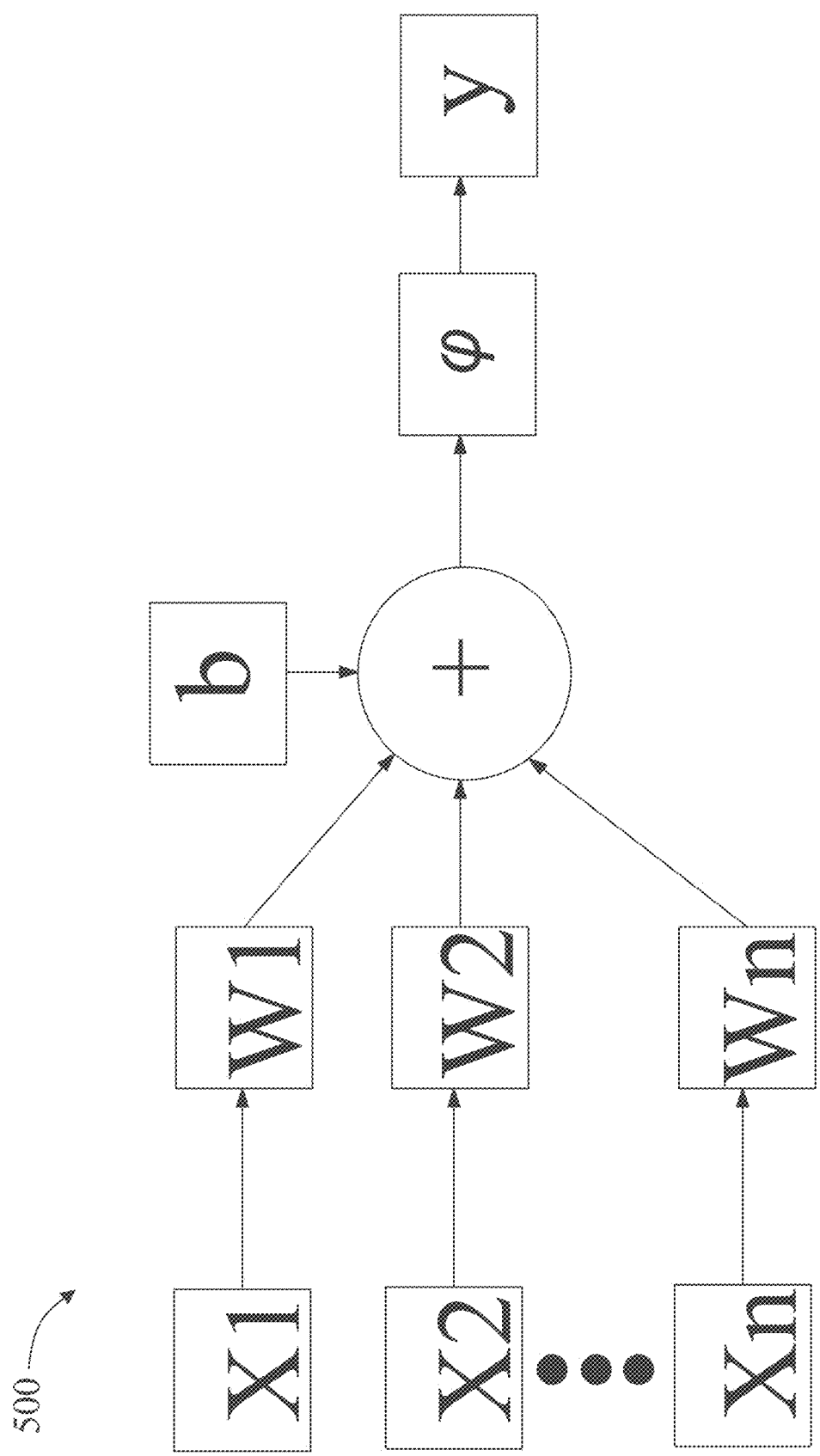
FIG. 5 is a diagram of an exemplary neural network node.

Referring now to FIG. 5, an exemplary embodiment of a node 500 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
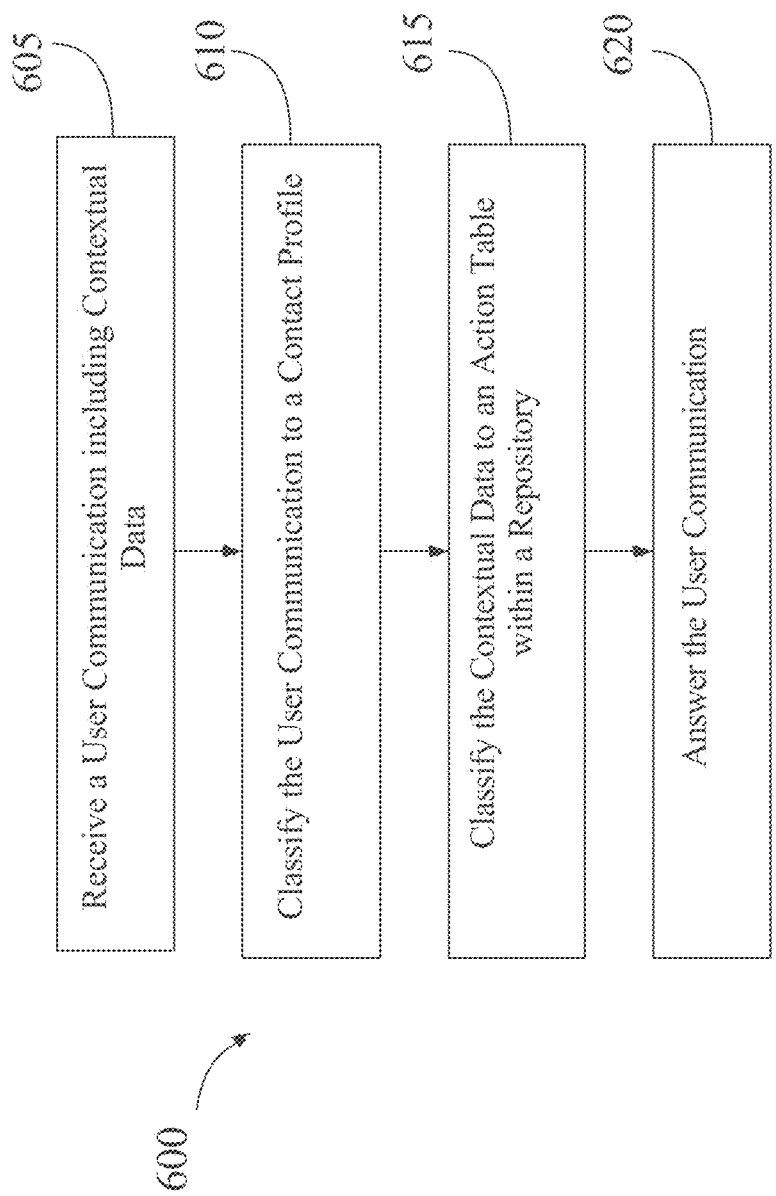
FIG. 6 is a flow diagram illustrating an exemplary work flow in answering a user communication.

Referring now to FIG. 6, an exemplary method of answering a user communication is illustrated. At step 605, method 600 includes receiving, by a computing device, a user communication comprising contextual data. This may be implemented with reference to FIGS. 1-5. At step 610, method 600 includes classifying, by the computing device, the user communication to a contact profile, wherein classifying the user communication to a contact profile includes preprocessing the user communication, extracting, using a feature extraction algorithm, features from the contextual data, training a contact classifier with historical data correlating contextual data to features of a plurality of contact profiles, inputting the processed user communication into the contact classifier, and outputting, by the contact classifier, the contact profile. This may be implemented with reference to FIGS. 1-5. At step 615, method 600 includes classifying, by the computing device, the contextual data to an action table within a repository. The action table may include an action rule including a protocol for the computing device to execute based on the contextual data wherein the computing device may be configured to execute the protocol. Classifying the contextual data to an action table may include ranking contextual data based on a priority. Ranking the contextual data based on priority may include training a machine learning model with training data correlating contextual data and contact profiles to urgency levels, inputting the contextual data into the machine learning model, and outputting an urgency level related to the priority using the machine learning model. This may be implemented with reference to FIGS. 1-5. At step 620, method 600 includes answering, by the computing device, the user communication. Answering the user communication may include selecting a machine learning model from a collection of machine learning models to perform an action based on the action table. Answering the user communication may include generating an outbound communication. Generating the outbound communication may include generating an executable code. Answering the user communication may include transmitting a request for a third party input in relation to the user communication. Answering the communication may include identifying a third party by training an identification machine learning model with training data including examples of user communications correlated to third parties and outputting, by the identification machine learning model, the third party. Generating the outbound communication may include generating a receipt indicating the status of a requested action of the user communication. This may be implemented with reference to FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
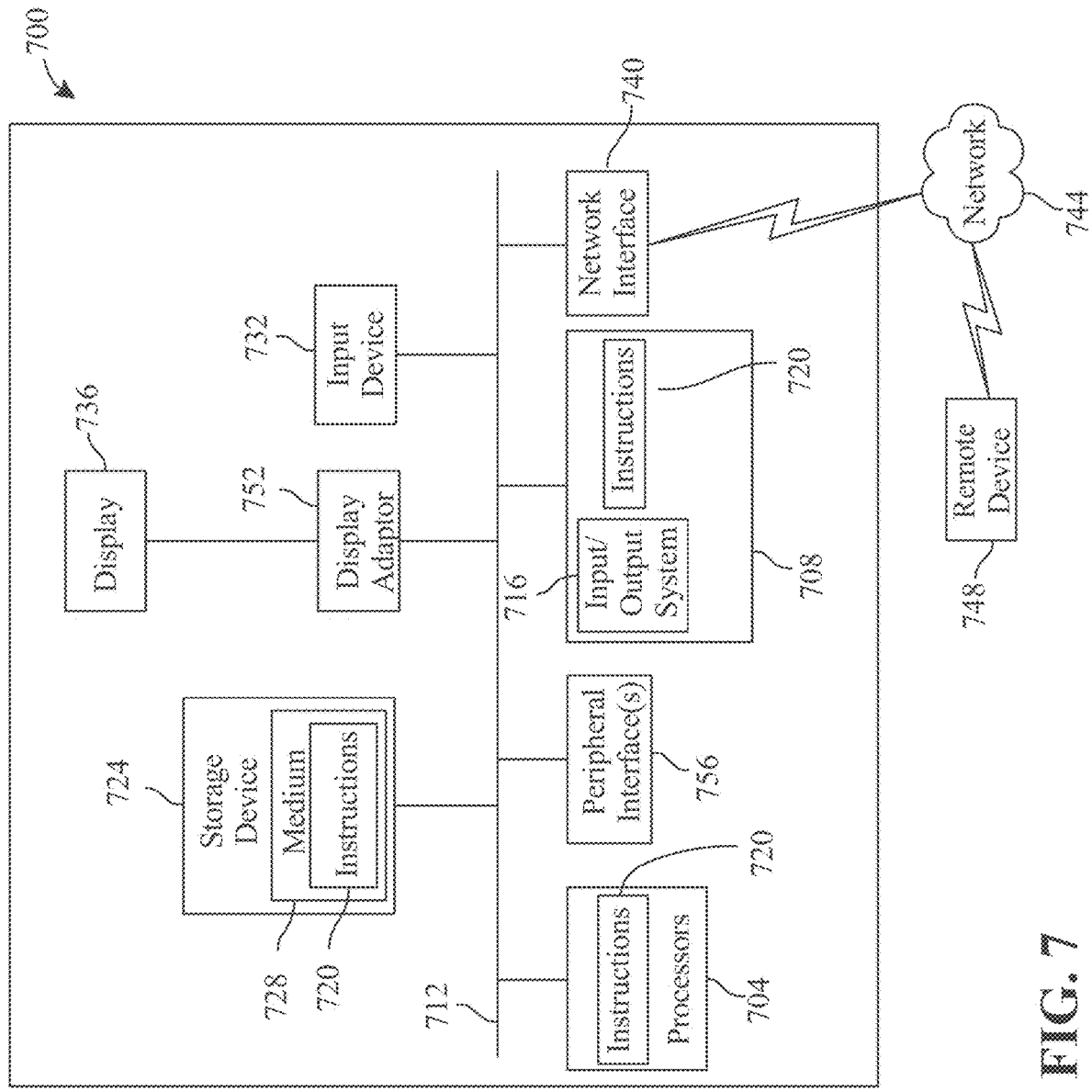
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIRE-WIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, apparatuses, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for answering a user communication, wherein the apparatus comprises:
   at least a processor;
   a computer-readable storage medium communicatively connected to the at least a processor, wherein the computer-readable storage medium contains instructions configuring the at least processor to:
   receive a user communication comprising contextual data;
   classify the user communication to a contact profile, wherein classifying the user communication to a contact profile comprises:
   preprocessing the user communication;
   extracting, using a feature extraction algorithm, features from the contextual data;
   training a contact classifier with historical data correlating contextual data to features of a plurality of contact profiles;
   inputting the preprocessed user communication into the contact classifier, and
   outputting, by the contact classifier, the contact profile;
   classify the contextual data to an action table within a repository;
   identify a third party by training an identification machine learning model with training data comprising examples of user communications correlated to third parties and outputting the third party; and
   answer the user communication by generating an outbound communication, wherein answering the user communication further comprises transmitting a request for an input from the third party in relation to the user communication.

2. The apparatus of claim 1, wherein:
   the action table comprises an action rule comprising a protocol for the least a processor to execute based on the contextual data; and
   the computer-readable storage medium contains instructions configuring the at least a processor to execute the protocol.

3. The apparatus of claim 1, wherein classifying the contextual data to an action table further comprises ranking contextual data based on a priority.

4. The apparatus of claim 3, wherein ranking the contextual data based on priority comprises:
   training a machine learning model with training data correlating contextual data and contact profiles to urgency levels;
   inputting the contextual data into the machine learning model; and
   outputting an urgency level related to the priority using the machine learning model.

5. The apparatus of claim 1, wherein answering the user communication comprises selecting a machine learning model from a collection of machine learning models to perform an action based on the action table.

6. The apparatus of claim 1, wherein generating the outbound communication comprises generating an executable code.

7. The apparatus of claim 1, wherein generating the outbound communication comprises generating a receipt indicating a status of a requested action of the user communication.

8. A method for answering a user communication, wherein the method comprises:
- receiving, by a computing device, a user communication comprising contextual data;
- classifying, by the computing device, the user communication to a contact profile, wherein classifying the user communication to a contact profile comprises:
  - preprocessing the user communication;
  - extracting, using a feature extraction algorithm, features from the contextual data;
  - training a contact classifier with historical data correlating contextual data to features of a plurality of contact profiles;
  - inputting the preprocessed user communication into the contact classifier, and outputting, by the contact classifier, the contact profile;
- classifying, by the computing device, the contextual data to an action table within a repository;
- identifying, by the computing device, a third party by training an identification machine learning model with training data comprising examples of user communications correlated to third parties and outputting the third party; and
- answering, by the computing device, the user communication by generating an outbound communication, wherein answering the user communication further comprises transmitting a request for an input from the third party in relation to the user communication.

9. The method of claim 8, wherein:
- the action table comprises an action rule comprising a protocol for the computing device to execute based on the contextual data; and
- to the method comprises, using the computing device, executing the protocol.

10. The method of claim 8, wherein classifying the contextual data to an action table further comprises ranking contextual data based on a priority.

11. The method of claim 10, wherein ranking the contextual data based on priority comprises:
- training a machine learning model with training data correlating contextual data and contact profiles to urgency levels;
- inputting the contextual data into the machine learning model; and
- outputting an urgency level related to the priority using the machine learning model.

12. The method of claim 8, wherein answering the user communication comprises selecting a machine learning model from a collection of machine learning models to perform an action based on the action table.

13. The method of claim 8, wherein generating the outbound communication comprises generating an executable code.

14. The method of claim 8, wherein generating the outbound communication comprises generating a receipt indicating a status of a requested action of the user communication.

* * * * *